US006758296B2

(12) United States Patent
Inaoka et al.

(10) Patent No.: US 6,758,296 B2
(45) Date of Patent: Jul. 6, 2004

(54) ENGINE MOUNTING STRUCTURE IN MOTORCYCLE (75) Inventors: Hiroshi Inaoka, Saitama (JP); Tsutomu Takeuchi, Saitama (JP); Atsushi Ishida, Saitama (JP); Kazuo Satoh, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 214 days.

(21) Appl. No.: 09/947,607

(22) Filed: Sep. 7, 2001

(65) Prior Publication Data

US 2002/0029916 A1 Mar. 14, 2002

(30) Foreign Application Priority Data

Sep. 8, 2000 (JP) ........................................ 2000-272708

(51) Int. Cl.[7] .............................................. B62K 11/02
(52) U.S. Cl. ...................................................... 180/228
(58) Field of Search ........................ 180/218, 227–228, 180/219

(56) References Cited

U.S. PATENT DOCUMENTS

| 2,687,048 | A | | 8/1954 | Butler | |
| 3,722,612 | A | | 3/1973 | Issigonis et al. | |
| 4,412,597 | A | * | 11/1983 | Aiba | 180/228 |
| 4,421,195 | A | | 12/1983 | Aiba | |
| 4,427,087 | A | * | 1/1984 | Inoue et al. | 180/219 |
| 4,696,363 | A | * | 9/1987 | Enda | 180/219 |
| 4,723,621 | A | * | 2/1988 | Kawano et al. | 180/219 |
| 4,765,432 | A | * | 8/1988 | Odom | 180/227 |
| 4,971,008 | A | * | 11/1990 | Morishita | 123/432 |
| 5,016,725 | A | * | 5/1991 | Muramatsu | 180/225 |
| 5,211,255 | A | * | 5/1993 | Fukuda | 180/219 |
| 5,261,504 | A | * | 11/1993 | Katsura | 180/219 |
| 6,349,785 | B1 | | 2/2002 | Ohmika et al. | |
| 6,513,613 | B2 | * | 2/2003 | Suzuki et al. | 180/227 |

FOREIGN PATENT DOCUMENTS

JP       B2 1-33392      7/1989

* cited by examiner

Primary Examiner—Lesley D. Morris
Assistant Examiner—Paul Royal, Jr.
(74) Attorney, Agent, or Firm—Birch, Stewart, Kolasch & Birch, LLP (57) ABSTRACT A scooter type motorcycle includes a rear fork for supporting a rear wheel of the motorcycle. A front portion of the rear fork is attached to a crankcase of an engine in a vertically swingable manner. The engine is mounted to a body frame through elastic members. The mounting arrangement enhances the comfort of the ride of the motorcycle by reducing vibrations from being transmitted from the rear wheel to the rider.

19 Claims, 6 Drawing Sheets

ENGINE MOUNTING STRUCTURE IN MOTORCYCLE

This nonprovisional application claims priority under 35 U.S.C. §119(a) on Patent Application No. 2000-272708 filed in Japan on Sep. 8, 2000, which is herein incorporated by reference.

BACKGROUND OF THE INVENTION

1. Field of the Invention

The present invention relates to an engine mounting structure in a motorcycle.

2. Description of the Background Art

In a certain motorcycle, an engine is mounted to a body frame and a rear fork is vertically swingably attached to the engine. As this type of a motorcycle there is known, for example, "Step Device in a Sitting Type Motorcycle" (hereinafter referred to as the "background art") disclosed in Japanese Examined Patent Publication No. Hei 1-33392.

According to the background art, as shown in FIG. 1 of the aforesaid publication, an engine E is mounted to a vehicle body 1 (this and the following reference numerals and marks are quoted from the aforesaid publication). A rear fork F is vertically swingably attached to a crankcase 18 of the engine E. A rear wheel Wr is rotatably secured to a rear portion of the rear fork F.

Further, in the background art, as shown in FIG. 2 of the aforesaid publication, an output shaft 19 is disposed behind a crankshaft 9 for transmitting power of the crankshaft 9 to a belt type continuously variable transmission M. A swing center of the rear fork F is aligned with the axis of the output shaft 19.

In the background art referred to above, the engine E, which is highly rigid, is fixed to the vehicle body 1 with bolts, thereby enhancing the rigidity of the vehicle body 1 to a greater extent. However, with travel of the motorcycle, the rear wheel Wr vibrates according to road surface conditions and this vibration (hereinafter "running vibration") is transmitted directly from the rear wheel Wr to the vehicle body 1 through the rear fork F and the engine E. Therefore, there is room for improvement in damping the running vibration transmitted to the vehicle body 1 and thereby enhancing the comfortableness in riding the motorcycle.

SUMMARY OF THE INVENTION

It is therefore an object of the present invention to provide a technique for enhancing the comfortableness in riding a motorcycle wherein a rear fork for supporting a rear wheel is swingably attached to a crankcase of an engine.

According to the invention, in a motorcycle wherein a front portion of a rear fork which supports a rear wheel is vertically swingably attached to a crankcase of an engine, there is provided an engine mounting structure characterized in that the engine is mounted to a body frame through elastic members. With travel of the motorcycle, the running vibration is damped by the elastic members and is therefore unlikely to be transmitted from the engine to the body frame.

According to the invention, a cylinder extends forward from the crankcase of the engine, the body frame is provided with a rising frame member which is substantially orthogonal to the cylinder in side view, and the elastic members are attached to the rising frame member in higher and lower positions respectively than the cylinder.

By extending the cylinder forward from the crankcase, spaces are formed above and below the crankcase. By utilizing these upper and lower spaces, elastic members are disposed in higher and lower positions respectively than the cylinder and are attached to a rising frame which is substantially orthogonal to the cylinder in side view. It is possible to ensure a sufficient distance between the upper and lower elastic members.

With running vibration, a moment acts on the case (e.g., crankcase) of the engine, centered on the upper or lower elastic member. The longer the distance between the upper and lower elastic members, the smaller the force based on the moment and acting on the upper or lower elastic member. Since the distance between the upper and lower elastic members can be set relatively large, it is possible to decrease the force acting on the upper or lower elastic member. As a result, the vibration absorbing performance of the elastic members is enhanced. The elastic members are disposed in higher and lower positions respectively than a swing center of the rear fork.

The swing center of the rear fork is aligned with the axis of a crankshaft of the engine. A swing angle of a mechanism (a power transfer mechanism) for transmitting power from the crankshaft to the rear wheel coincides with a swing angle of the rear fork. Consequently, the construction of the power transfer mechanism becomes simpler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

An embodiment of the present invention will be described hereafter with reference to the accompanying drawings. In the following description, "front," "rear," "left," "right," "upper," and "lower" represent directions as seen from the rider side, and Fr, Rr, L, R, and CL stand for front side, rear side, left side, right side, and a vehicle body center (vehicle width center), respectively.

Figure 1:
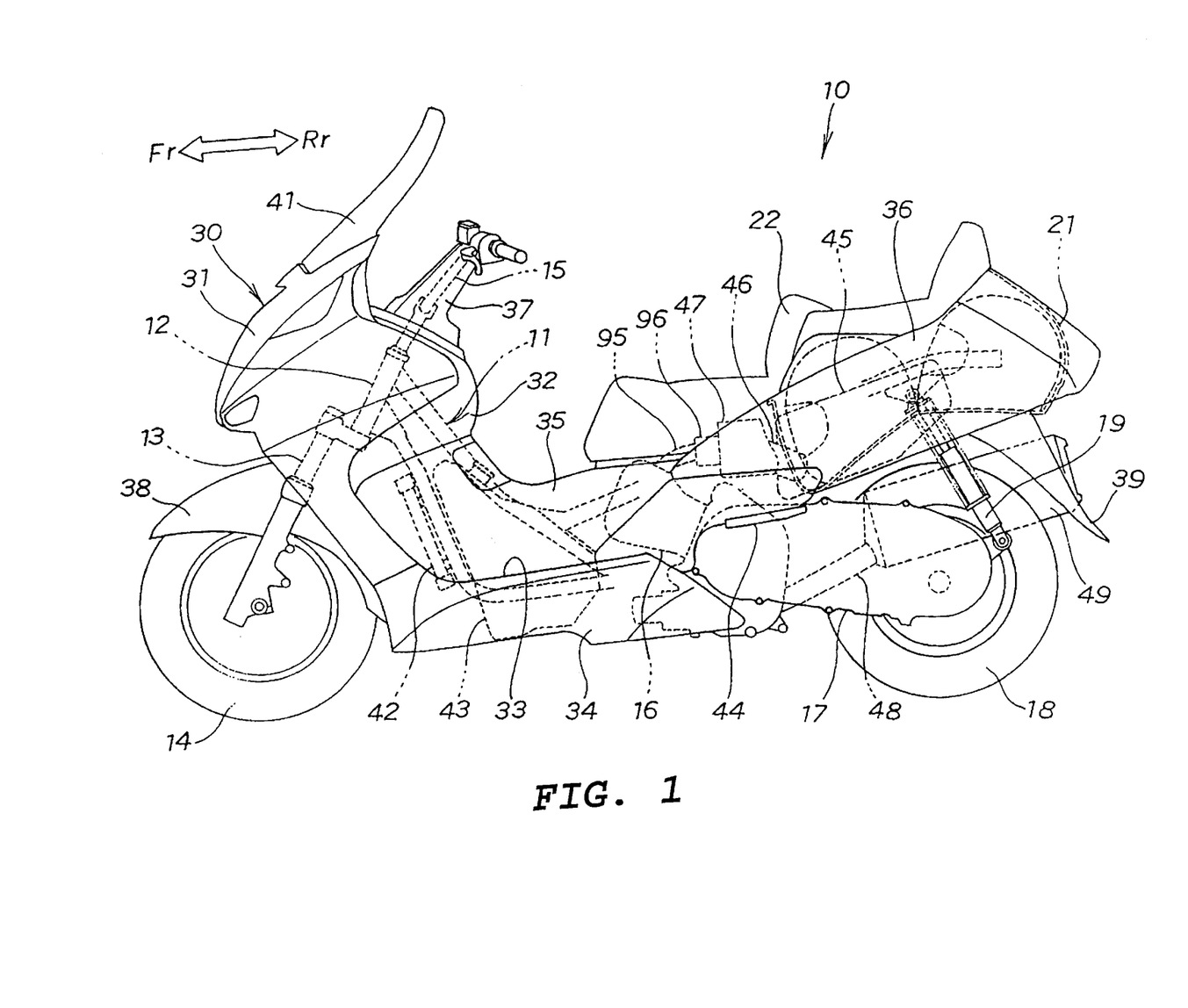
FIG. 1 is a left side view of a motorcycle related to the present invention.

As shown in FIG. 1, a scooter type motorcycle 10 includes a body frame 11, and a front fork 13 attached to a head pipe 12 of the body frame 11. A front wheel 14 is secured to the front fork 13, and a handlebar 15 is connected to the front fork 13. An engine 16 is mounted to a rear portion of the body frame 11, and a power transfer mechanism 17 is vertically swingably attached to the engine 16. A rear wheel 18 is secured to the power transfer mechanism 17, and rear cushion units 19 suspend a rear end portion of the power transfer mechanism 17 from the body frame 11. A container box 21 is attached to an upper position of the rear portion of the body frame 11, and a double seat 22 is disposed on the container box 21 so that it can be opened and closed.

In the motorcycle 10, moreover, the body frame 11 is covered with a body cover 30. The body cover 30 comprises a front cover 31 which covers a front portion of the head pipe 12, an inner cover 32 which covers a rear portion of the front cover 31, right and left floor steps 33 of a low floor type for the rider to put his or her feet thereon, right and left floor skirts 34 extending downwardly from outer edges of the floor steps 33, a center cover 35 extending rearwardly from the inner cover 32 to cover a longitudinally central portion of the body frame 11, and a rear cover 36 extending rearwardly from the center cover 35 to cover the rear portion of the body frame 11.

In FIG. 1, reference numeral 37 denotes a handlebar cover, numeral 38 is a front fender, numeral 39 is a rear fender, and numeral 41 is a windscreen. Reference numeral 42 is a radiator for cooling the engine, numeral 43 is a fuel tank, and numeral 44 is a passenger step. Reference numeral 45 is an air cleaner, numeral 46 is a connecting tube, and numeral 47 is an air chamber. Reference numeral 48 is an exhaust pipe for the engine, and numeral 49 is a muffler for exhaust.

Figure 2:
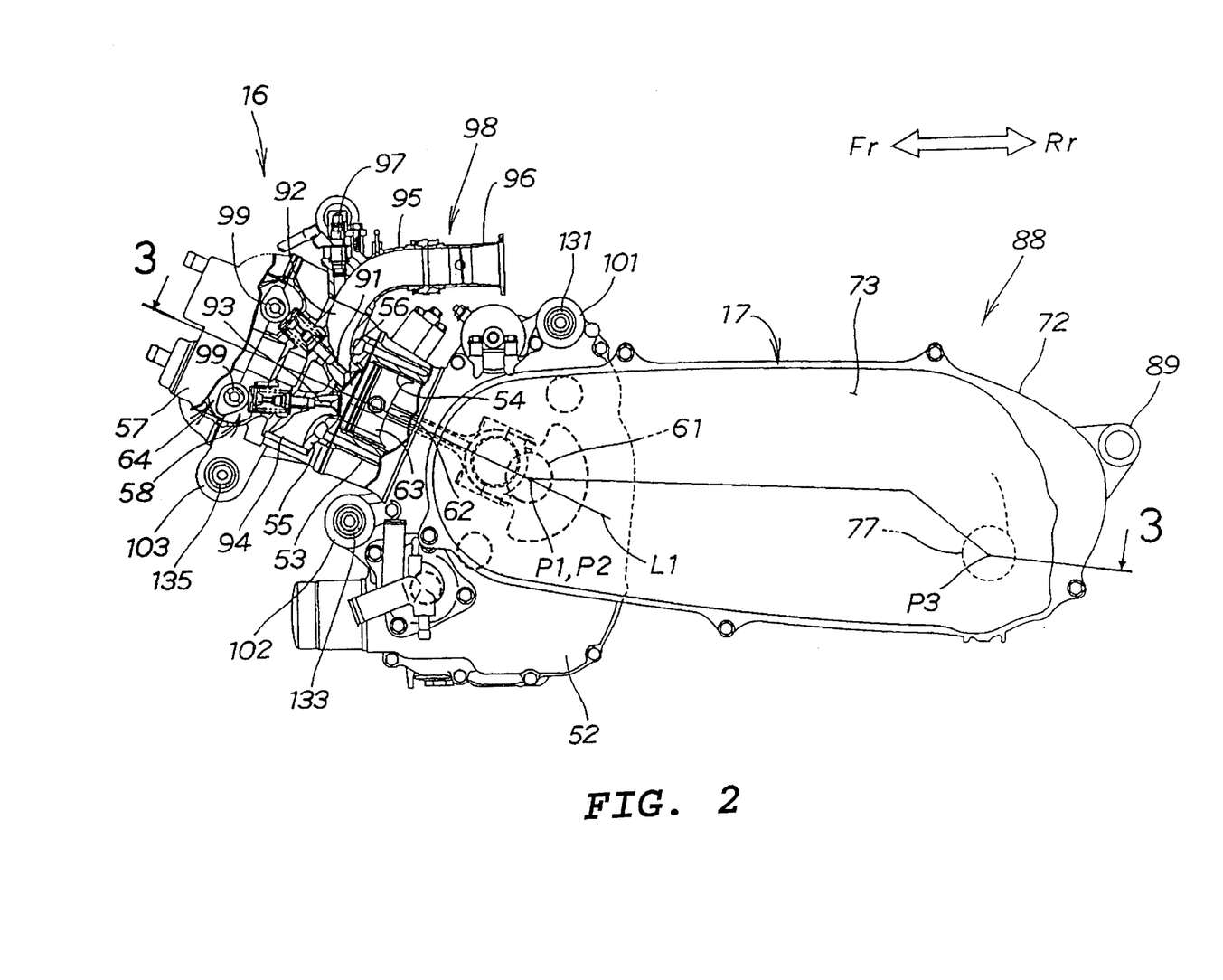
FIG. 2 is left side view of an engine and a power transfer mechanism both related to the present invention.

Referring now to FIG. 2, the engine 16 is a water-cooled, 4-cycle 2-cylinder engine in which a cylinder 54 extends forward from a crankcase 52. The axis of the cylinder 54 is assumed to be L1.

Figure 3:
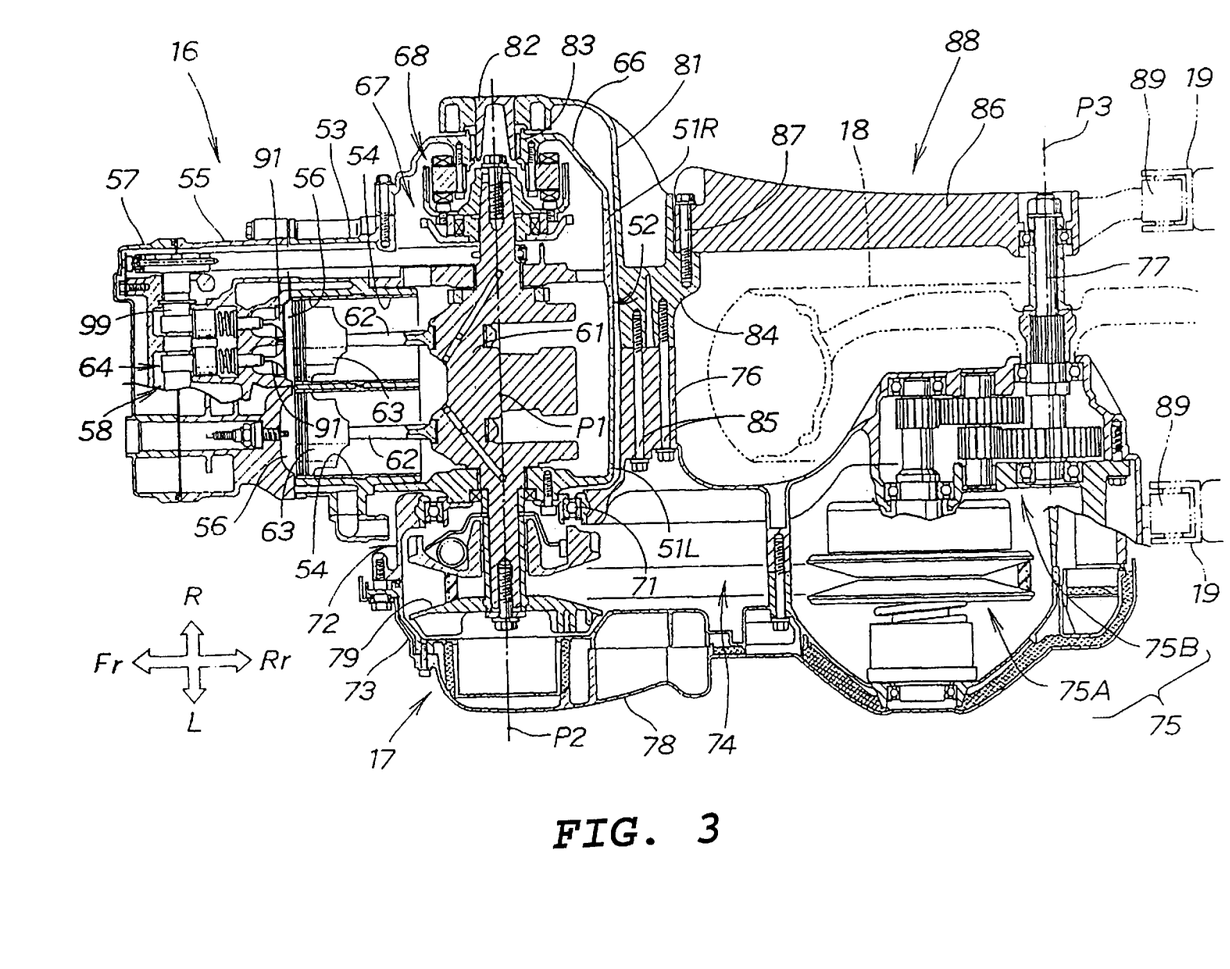
FIG. 3 is a sectional view taken on line 3—3 in FIG. 2.

Referring now to FIG. 3, a case portion of the engine 16 includes a crankcase 52 comprising left and right case halves 51L, 51R coupled together with bolts. A cylinder block 53 is bolted to a front portion of the crankcase 52. Two right and left cylinders 54 are disposed within the cylinder block 53. A cylinder head 55 is bolted to a front portion of the cylinder block 53. A pair of combustion chambers 56 are formed in the cylinder head 55. A head cover 57 is bolted to a front portion of the cylinder head 55. A valve operating chamber 58 is formed between the cylinder head 55 and the head cover 57.

The engine 16 includes a crankshaft 61 rotatably mounted to the crankcase 52 and extending right and left. A pair of pistons 63 are connected to the crankshaft 61 through a pair of connecting rods 62 and are adapted to reciprocate within the cylinders 54. A valve operating mechanism 64 is accommodated within the valve operating chamber 58.

A generator cover 66 is bolted to the right side portion of the right case half 51R to form a generator receiving chamber 67 between the right case half 51R and the generator cover 66, and a generator 68 is received within the generator receiving chamber 67. The generator 68 is connected to a right end portion of the crankshaft 61. Since the generator cover 66 is fixed to the crankcase 52, it is assumed to be a part of the crankcase 52 in the present invention.

The power transfer mechanism 17 is made up of a transfer mechanism case 72 which is vertically swingably secured at a front portion thereof to the left case half 51L through a bearing 71 and which extends rearward. A case cover 73 closes a side opening of the transfer mechanism case 72. A transfer mechanism receiving chamber 74 is formed between the transfer mechanism case 72 and the case cover 73, and a transfer mechanism 75 is received within the transfer mechanism receiving chamber 74. The transfer mechanism case 72 is formed with a boss portion 76 which projects from a longitudinally intermediate position to the transversely central side.

The transfer mechanism 75 includes a combination of a belt type speed change mechanism 75A connected to the crankshaft 61 and a gear mechanism 75B connected to the belt type speed change mechanism 75A. A rear wheel axle 77 is connected to an output side of the gear mechanism 75B and is supported rotatably. Reference numeral 78 denotes a cover.

A front arm 81 is vertically swingably mounted to the generator cover 66. More specifically, a support shaft 82 is integral with a front portion of the front arm 81 and is supported by the generator cover 66 rotatably through a bearing 83.

The front arm 81 extends rearward and a boss portion 84 is projected from a rear end of the front art 81 to the transversely central side along a rear portion of the crankcase 52. The boss portion 76 of the transfer mechanism case 72 is connected to the boss portion 84 with bolts 85. Further, a rear arm 86 is connected to a rear portion of the front arm 81 with a bolt 87. The rear arm 86 extends rearward and the rear axle 77 is supported rotatably by a rear end portion of the rear arm 86.

Such a combined structure of the transfer mechanism case 72 and the front and rear arms 81, 86 constitutes a rear fork (swing arm) 88 which is generally H-shaped in plan. Therefore, a front portion of the rear fork 88 which supports the rear wheel 18 through the rear wheel axle 77 can be vertically swingably secured to the crankcase 52.

The present invention is characterized in that a swing center P2 of the rear fork 88, i.e., a swing center P2 of the transfer mechanism case 72 and the front arm 81, is made coincident with a center P1 of the crankshaft 61. If the swing center P2 of the rear fork 88 is not in alignment with (is offset from) the center P1 of the crankshaft 61, a swing angle of the mechanism (transfer mechanism) for the transfer of power from the crankshaft 61 to the rear wheel 18 is different from that of the rear fork 88. Consequently, the construction of the transfer mechanism is compelled to become complicated.

In contrast therewith, in the present invention, the swing center P2 of the rear fork 88 is coincident with the center P1 of the crankshaft P1. To be more specific, by connecting a driving pulley 79 in the transfer mechanism 75 directly with the crankshaft 61, an input-side center of the transfer mechanism 75 and the swing center P2 of the transfer mechanism case 72 are made coincident with the center P1 of the crankshaft 61. As a result, the swing angle of the transfer mechanism 75 becomes equal to the swing angle of the rear fork 88. Thus, the structure of the transfer mechanism 75 (a mechanism for the transfer of power from the crankshaft 61 to the rear wheel 18) becomes simpler.

In the foregoing background art (Japanese Examined Patent Publication No. Hei 1-33392), the power of the crankshaft is transmitted through an output shaft to a belt type continuously variable transmission and the swing center of the rear fork is made coincident with the swing center of the output shaft. In the present invention, such an output shaft is not used and therefore the structure of the transfer mechanism becomes simpler.

FIG. 3 further illustrates that a pair of brackets 89 which connect lower portions of the right and left rear cushion units 19 are provided at rear ends of the transfer mechanism case 72 and the rear arm 86.

Turning back to FIG. 2, the cylinder head 55 is integrally formed with intake ports 92 contiguous to the combustion chambers 56 and having intake valves 91, and exhaust ports 94 contiguous to the combustion chambers 56 and having exhaust valves 93. When the engine 16 is seen sideways, the intake ports 92 are upward openings, while the exhaust ports 94 are downward openings.

An inlet pipe 95 connected to each intake port 92 extends rearward of the cylinder head 55, and a throttle valve 96 is connected to a rear end (upstream end) of the inlet pipe 95. An upstream end of the throttle valve 96 faces rearward. The inlet pipe 95 is equipped with a fuel injector 97 for the injection of fuel toward each intake valve 91.

Such a combined structure of each intake port 92, inlet pipe 95 and throttle valve 96 constitutes an intake passage 98. In other words, the intake passage 98 extends rearward from an upper portion of each cylinder 54 and the intake port therein is allowed to face rearward. Further, the intake port of the intake passage 98, i.e., the upstream end of the throttle valve 96, is connected to the air cleaner 45 through the air chamber 47, as shown in FIG. 1. The components identified by numeral 99 are cam shafts in the valve operating mechanism 64.

The crankcase 52 of the engine 16 is provided with upper mounting brackets 101 and lower mounting brackets 102, and front mounting brackets 103 are provided at a lower portion of the cylinder head 55. More specifically, the upper mounting brackets 101 are provided at a higher position than the cylinder 54, while the lower mounting brackets 102 and the front mounting brackets 103 are positioned lower than the cylinder 54.

Figure 4:
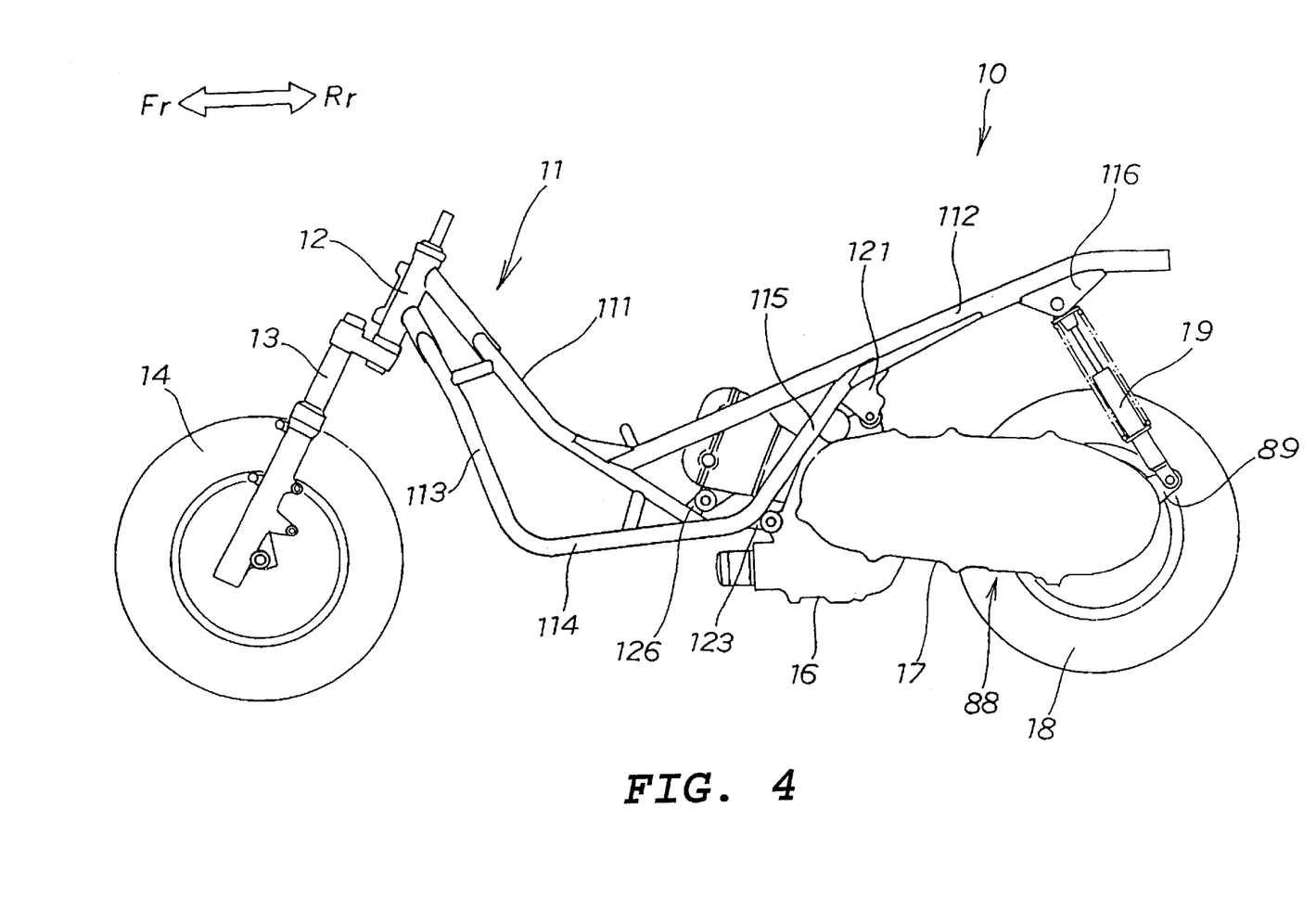
FIG. 4 is a left side view of a body frame related to the present invention.

Referring to FIG. 4, the body frame 11 is a double cradle type frame in which a pair of main pipes 111 extend rearwardly downward from the head pipe 12. A pair of seat rails 112 extend rearwardly upward from longitudinally intermediate positions of the main pipes 111. A pair of down-pipes 113 extend below the main pipes 111 and rearwardly downward from the head pipe 12. A pair of lower pipes 114 extend rearwardly from lower ends of the down-pipes 113. Lower ends of the main pipes 111 are connected to longitudinally intermediate positions of the lower pipes 114. Upper pipes 115 (rising frame members) extend rearwardly upward from rear ends of the lower pipes 114. Rear ends of the upper pipes 115 are connected to longitudinally intermediate positions of the seat rails 112.

FIG. 4 shows that a pair of brackets 116 which connect upper portions of the right and left rear cushions 19 (only the left-hand one, i.e., the one located on this side in the figure, is shown) are provided at rear portions of the seat rails 112. By connecting the rear cushion units 19 between the brackets 89 of the rear forks 88 and the brackets 116 of the seat rails 112, it is possible to suspend a rear portion of the rear fork 88 at right and left positions thereof from the body frame 11 through the rear cushion units 19.

Figure 5:
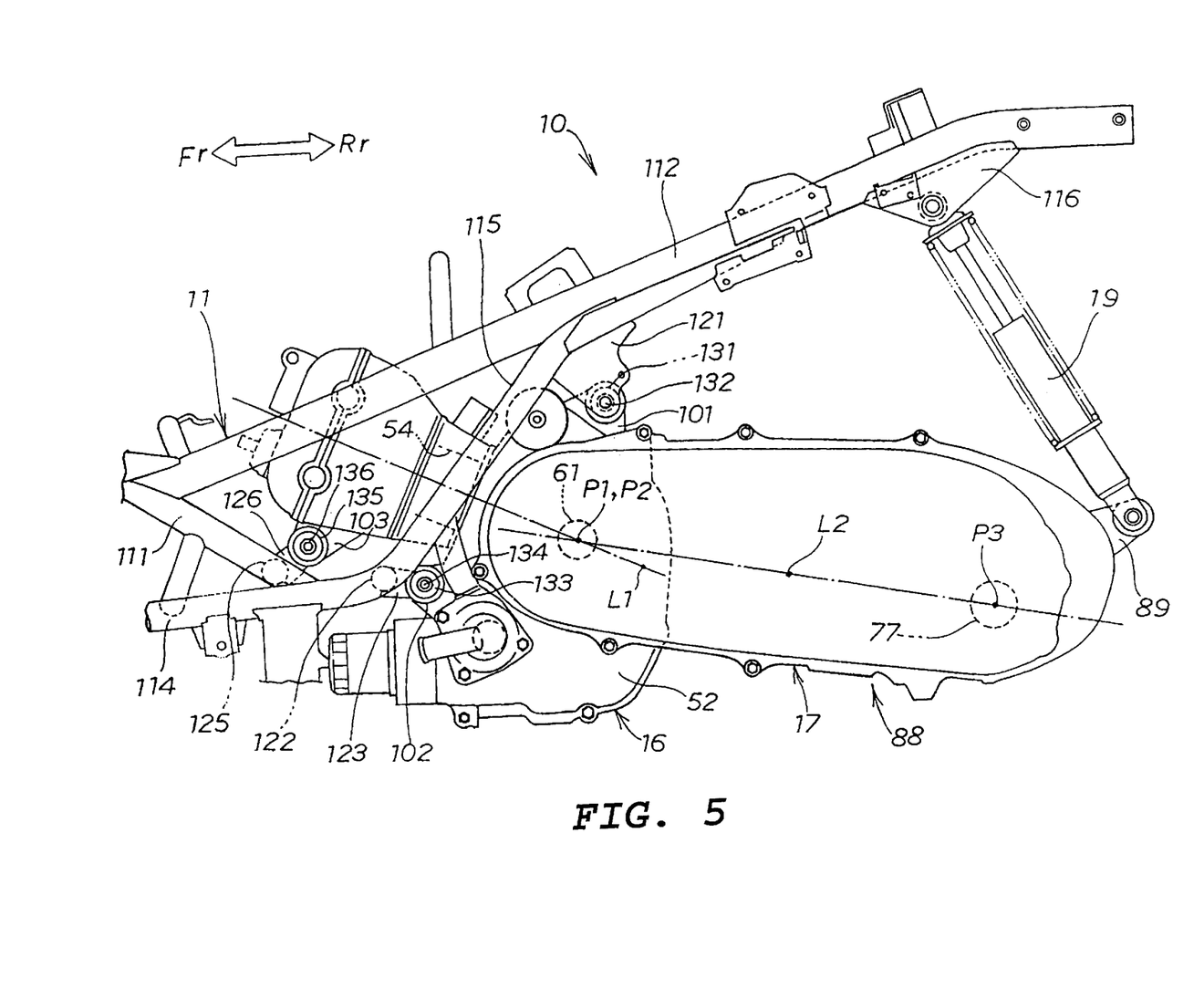
FIG. 5 is a left side view of a rear portion of the body frame, the engine, and the power transfer mechanism.

Referring to FIG. 5, the right and left upper pipes 115 (only the left-hand one, i.e., the one located on this side in the figure, is shown) as rising frame members of the body frame 11 are substantially orthogonal to each cylinder 54 in side view, that is, they are substantially orthogonal to the axis L1 of the cylinder. Right and left upper brackets 121 are provided at upper ends of the right and left upper pipes 115. A first cross member 122 is disposed bridgewise between lower ends of the upper pipes 115, and a lower bracket 123 is provided on the first cross member 122.

A second cross member 125 is disposed bridgewise between the lower end portions of the right and left main pipes 111, and a front bracket 126 is provided on the second cross member 125. L2 represents a line passing through the center P1 of the crankshaft 61 and also through a center P3 of the rear wheel axle.

Figure 6:
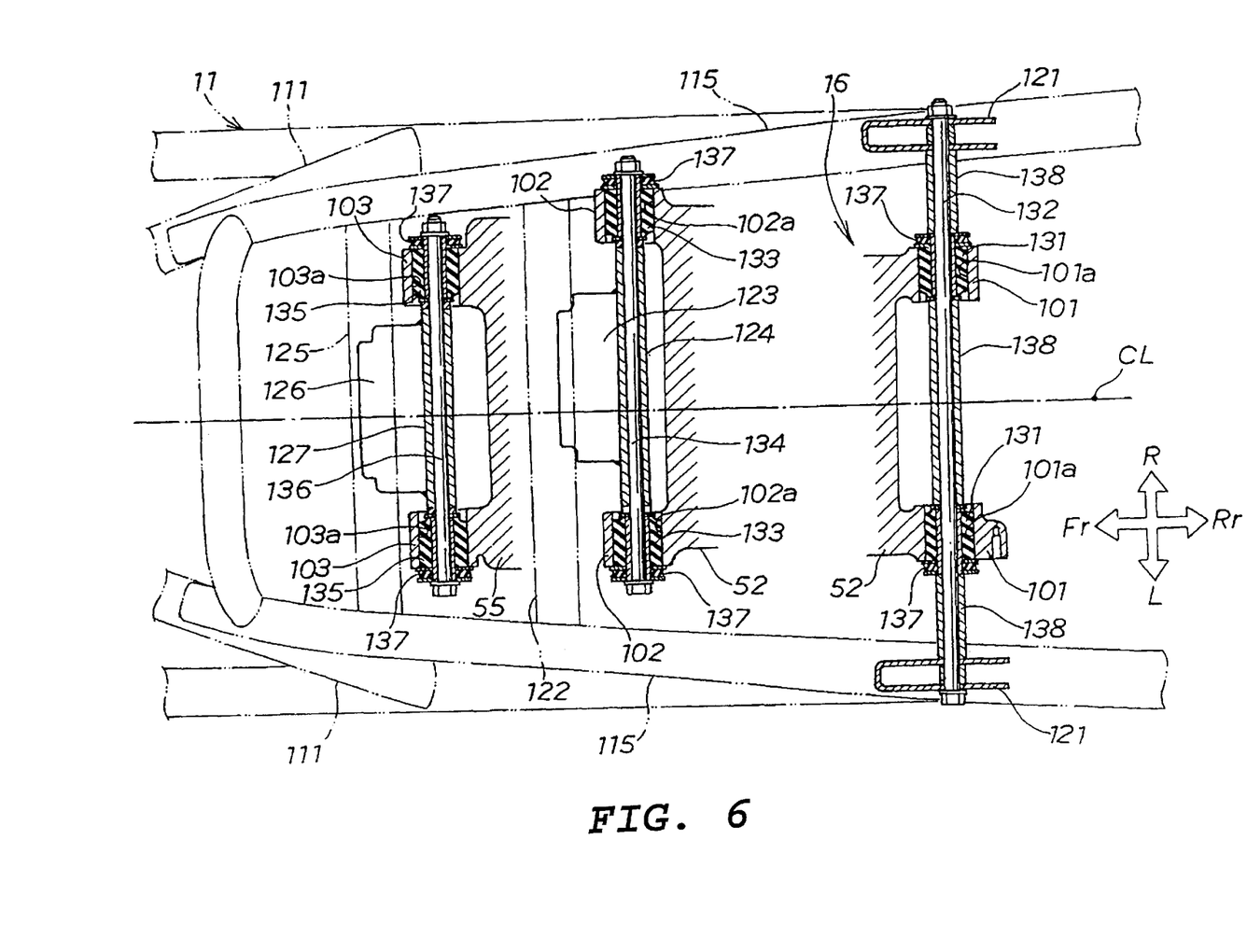
FIG. 6 is a plan view of an engine mounting portion according to the present invention.

Referring now to FIG. 6, the upper brackets 121 are attached to the right and left upper pipes 115. The first cross member 122 is mounted bridgewise between the right and left upper pipes 115. The lower bracket 123 is attached to the first cross member 122. A pipe-like lower pivot portion 124 is provided in the lower bracket 123. The second cross member 125 is mounted bridgewise between the right and left main pipes 111. The front bracket 126 is attached to the second cross member 125, and a pipe-like front pivot portion 127 is provided in the front bracket 126.

According to a first mounting structure of the engine 16, a pair of bushing holes 101a are formed in the right and left upper mounting brackets 101 provided on the crankcase 52. Annular bushings 131 are fitted in the bushing holes 101a respectively, and the rubber bushings 131 and the right and left upper brackets 121 are fixed together using a single pivot shaft 132 extending in the transverse direction.

According to a second mounting structure of the engine 16, a pair of bushing holes 102a are formed in the right and left lower mounting brackets 102 provided on the crankcase 52. Annular rubber bushings 133 are fitted in the bushing holes 102a respectively, and the rubber bushings 133 and the lower pivot portion 124 are fixed together using a single pivot shaft 134 extending in the transverse direction.

According to a third mounting structure of the engine 16, a pair of bushing holes 103a are formed in the right and left front mounting brackets 103 provided on the cylinder head 55. Annular bushings 135 are fitted in the bushing holes 103a respectively, and the rubber bushings 135 and the front pivot portion 127 are fixed together using a single pivot shaft 136 extending in the transverse direction. It is optional whether the third engine mounting structure of the engine 16 is to be provided or not.

The rubber bushings 131, 133 and 135 are elastic members for absorbing vibration of the engine 16. The pivot shaft 132, 134 and 136 are bolt-nut combinations. In the figure, the components identified by numeral 137 are elastic members for absorbing right and left vibrations of the engine 16 and the components identified by numeral 138 are collars. The present invention is characterized in that the engine 16 is mounted through the rubber bushings 131, 133 and 135 (elastic members) to the body frame 11.

Turning back to FIG. 5, the present invention is characterized in that the rubber bushings 131 for the upper mounting brackets 101 are attached to the upper brackets 121 positioned higher than the cylinder 54 and are thereby attached to the upper pipes 115 in a higher position than the cylinder 54, and that the rubber bushings 133 for the lower mounting brackets 102 are attached to the lower bracket 123 positioned lower than the cylinder 54 and are thereby attached to the upper pipes 115 in a lower position than the cylinder 54.

The present invention is further characterized in that the rubber bushings 131 for the upper mounting brackets 101 are positioned higher than the swing center P2 of the rear fork 88 and that the rubber bushings 133 for the lower mounting brackets 102 are positioned lower than the swing center P2 of the rear fork 88.

With travel of the motorcycle 10, the rear wheel 18 (see FIG. 4) vibrates according to road surface conditions. Since the engine 16 is mounted to the body frame 11 through the rubber bushings (elastic members) 131, 133 and 135, the running vibration transmitted from the rear wheel 18 to the engine 16 through the rear fork 88 is damped by the rubber bushings 131, 133 and 135 and therefore it is possible to make the vibration difficult to be transmitted to the body frame 11. Accordingly, it is possible to enhance the comfortableness of the motorcycle 10 with the rear fork 88 attached swingably to the crankcase 52.

Further, by extending the cylinder 54 forward from the crankcase 52, it is possible to ensure spaces above and below the crankcase 52. By utilizing these upper and lower surplus spaces, the rubber bushings 131 and 133 are disposed in upper and lower positions respectively with respect to the cylinder 54, and are attached to the upper pipes 115 which are approximately orthogonal to the cylinder 54 in side view. That is, the rubber bushings 131 and 133 are disposed in upper and lower positions respectively with respect to the swing center P2.

Thus, it is easy to ensure spaces for installation of the rubber bushings 131 and 133. In addition, the structure of the body frame 11 for installing the rubber bushings 131 and 133 are simple. Further, it is possible to ensure a sufficient distance between the upper and lower rubber bushings 131, 133.

Due to the running vibration, a moment acts on the crankcase 52 (cases) of the engine 16, centered on the upper rubber bushing 131 or the lower rubber bushing 133. With this moment, the longer the distance between the upper and lower rubber bushings 131, 133, the smaller the force acting on the upper rubber bushing 131 or the lower rubber bushing 131.

In the present invention, as described above, the rubber bushings 131 and 133 are disposed in higher and lower positions respectively with respect to the cylinder 54, that is, in higher and lower positions respectively than the swing center P2 of the rear fork 88. Therefore, the distance between the rubber bushings 131 and 133 can be set relatively large. As a result, the force acting on the rubber bushings 131 and 133 becomes smaller and hence the vibration absorbing performance of the rubber bushings 131 and 133 is enhanced. Thus, the running vibration transmitted to the engine 16 is further damped by the rubber bushings 131 and 133, so that it is possible to make the running vibration difficult to be transmitted to the body frame 11 and hence possible to further enhance the comfortableness in riding the motorcycle.

Although the motorcycle 10 described in the above embodiment is a scooter type motorcycle, no limitation is made thereto. The engine 16 is not limited to a 2-cylinder engine, but it may be a single or multi-cylinder engine. The number of the rear cushions 19 is not limited to two disposed on the right and left sides, but it may be one. The front arm 81 which constitutes the rear fork 88 may be attached vertically swingably to the crankcase 52 directly without interposing the generator cover 66 therebetween.

The structure of the rear fork 88 is not limited to the combined structure of the transfer mechanism case 72 and the front and rear arms 81, 86. For example, it may comprise only the arms without being combined with the transfer mechanism case 72, or the rear fork 88 may be constituted of a single member.

Since the present invention is constructed as above, the following effects are obtained. Since the engine is mounted to the body frame through elastic members, the running vibration transmitted from the rear wheel to the engine through the rear fork is damped by the elastic members and hence it is possible to make it difficult to be transmitted to the body frame. Consequently, it is possible to enhance the comfortableness in riding the motorcycle in which the rear fork for supporting the rear wheel is swingably attached to the crankcase.

The cylinder is extended forward from the crankcase to form spaces above and below the crankcase, and elastic members are disposed in higher and lower positions respectively than the cylinder and are attached to a rising frame which is substantially orthogonal to the cylinder in side view. Therefore, it is easy to ensure spaces for installation of the elastic members and the structure of the body frame for mounting the elastic members is simple. Further, it is possible to ensure a sufficient distance between the upper and lower elastic members.

With running vibration, a moment acts on the case (crankcase, etc.) of the engine, centered at the upper or lower elastic member. The longer the distance between the upper and lower elastic members, the smaller the force based on the moment and acting on the upper or the lower elastic member. Since the upper and lower elastic members are disposed in higher and lower positions than the cylinder, the distance between the elastic members can be set relatively large. With consequent decrease of the force acting on the upper or the lower elastic member, the vibration absorbing performance of the elastic members is enhanced. Therefore, the running vibration transmitted to the engine is damped to a greater extent by the elastic members, whereby it is possible to make the vibration difficult to be transmitted to the body frame and hence possible to further enhance the comfortableness in riding the motorcycle. The elastic members are disposed in higher and lower positions respectively than the swing center of the rear fork.

Since the swing center of the rear fork is aligned with the center of the crankshaft of the engine, a swing angle of the mechanism (power transfer mechanism) for the transfer of power from the crankshaft to the rear wheel can be made coincident with the swing angle of the rear fork. Therefore, it is possible to simplify the construction of the power transfer mechanism.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An engine mounting structure in a motorcycle wherein a front portion of a rear fork which supports a rear wheel is vertically swingably attached to a crankcase of an engine, wherein the engine is mounted to a body frame through elastic members, wherein the swing center of the rear fork is coincident with the axis of a crankshaft of the engine.

2. The engine mounting structure in a motorcycle according to claim 1, wherein a cylinder extends forward from the crankcase of the engine, the body frame is provided with a rising frame member which is substantially orthogonal to the cylinder in side view, and the elastic members are attached to the rising frame member in higher and lower positions respectively than the cylinder.

3. The engine mounting structure in a motorcycle according to claim 1, wherein the elastic members are disposed in higher and lower positions respectively than a the swing center of the rear fork.

4. A motorcycle comprising:
a frame;

an engine supported by said frame, said engine including a crankcase having a crankshaft rotatably disposed therein, said engine further including a cylinder extending forwardly from said crankcase;

a rear fork attached to said crankcase and extending rearwardly of said engine, said rear fork being vertically swingable about a fork pivot axis;

a rear wheel rotatably supported by said rear fork;

a first elastic support located between said engine and said frame for supporting said engine on said frame, said first elastic support being located vertically above a line extending along said cylinder and through said fork pivot axis; and a second elastic support located between said engine and said frame for supporting said engine on said frame, said second elastic support being located vertically below the line extending along said cylinder and through said fork pivot axis, wherein the rear fork pivot axis is coincident with the axis of the crankshaft of the engine.

5. The motorcycle as set forth in claim 4, wherein said engine includes a first mounting bracket extending from said crankcase, said first elastic support supporting said first mounting bracket.

6. The motorcycle as set forth in claim 5, wherein said engine includes a second mounting bracket extending from said crankcase, said second elastic support supporting said second mounting bracket.

7. The motorcycle as set forth in claim 6, further comprising a third elastic support located between said engine and said frame for supporting said engine on said frame, said third elastic support being located vertically below the line extending along said cylinder and through said fork pivot axis.

8. The motorcycle as set forth in claim 7, wherein said engine includes a third mounting bracket extending from said cylinder, said third elastic support supporting said third mounting bracket.

9. The motorcycle as set forth in claim 8, further comprising a first support shaft attached to said frame, said first elastic support being interposed between said first support shaft and said first mounting bracket.

10. The motorcycle as set forth in claim 9, further comprising a second support shaft attached to said frame, said second elastic support being interposed between said second support shaft and said second mounting bracket.

11. The motorcycle as set forth in claim 10, further comprising a third support shaft attached to said frame, said third elastic support being interposed between said third support shaft and said third mounting bracket.

12. The motorcycle as set forth in claim 11, wherein said first elastic support, said second elastic support, and said third elastic support each comprise cylindrical elastic bushings.

13. The motorcycle as set forth in claim 4, further comprising a third elastic support located between said engine and said frame for supporting said engine on said frame, said third elastic support being located vertically below the line extending along said cylinder and through said fork pivot axis.

14. The motorcycle as set forth in claim 4, wherein said first elastic support and said second elastic support each comprise cylindrical elastic bushings.

15. The motorcycle as set forth in claim 4, wherein said fork pivot axis is coincident with an axis of rotation of said crankshaft.

16. The motorcycle as set forth in claim 4, further comprising a first support shaft attached to said frame for supporting said first elastic support.

17. The motorcycle as set forth in claim 16, further comprising a second support shaft attached to said frame for supporting said second elastic support.

18. A motorcycle comprising:

a frame;

an engine supported by said frame, said engine including a crankcase having a crankshaft disposed therein and rotatable about a first axis, said engine further including a cylinder extending forwardly from said crankcase;

a first elastic support located between said engine and said frame for supporting said engine on said frame, said first elastic support being located vertically above a line extending along said cylinder and through said first axis;

a second elastic support located between said engine and said frame for supporting said engine on said frame, said second elastic support being located vertically below the line extending along said cylinder and through said first axis; and a third elastic support located between said engine and said frame for supporting said engine on said frame, said third elastic support being located vertically below the line extending along said cylinder and through said first axis, wherein the swing center of the rear fork is coincident with the first axis of the crankshaft of the engine.

19. The motorcycle as set forth in claim 18, wherein said engine includes:

a first mounting bracket extending from said crankcase, said first elastic support supporting said first mounting bracket;

a second mounting bracket extending from said crankcase, said second elastic support supporting said second mounting bracket; and a third mounting bracket extending from said cylinder, said third elastic support supporting said third mounting bracket.

* * * * *